United States Patent [19]
Orkin

[11] 4,108,505
[45] Aug. 22, 1978

[54] BEARING ASSEMBLY
[75] Inventor: Stanley S. Orkin, Rockville, Conn.
[73] Assignee: Kamatics Corporation, Bloomfield, Conn.
[21] Appl. No.: 731,816
[22] Filed: Oct. 12, 1976

Related U.S. Application Data
[62] Division of Ser. No. 597,632, Jul. 21, 1975, Pat. No. 4,033,019.

[51] Int. Cl.$^2$ ............................................. F16C 23/00
[52] U.S. Cl. ..................................................... 308/72
[58] Field of Search ..................... 308/72, 29, 238, 194

[56] References Cited
U.S. PATENT DOCUMENTS

| | | | |
|---|---|---|---|
| 3,711,171 | 1/1973 | Orkin et al. | 308/72 |
| 3,934,953 | 1/1976 | Tooley | 308/72 |

Primary Examiner—Richard A. Bertsch
Attorney, Agent, or Firm—Cushman, Darby & Cushman

[57] ABSTRACT

The disclosure embraces a self-aligning spherical bearing having two hemispherical rings; each of the rings have inner annular surfaces and substantially planar mating surfaces; one of the mating surfaces is provided with a recess adjacent its inner arcuate edge while the other mating surface is provided with a projecting lip on its inner arcuate edge so that, when the mating surfaces are disposed in abutting relationship, the recess and lip will define a circumferential cavity; a ball member is disposed between the ring members prior to placing the mating surfaces in abutting relationship and then the mating surfaces are fusion-bonded by an energized beam of electrons to form the assembled spherical bearing.

1 Claim, 4 Drawing Figures

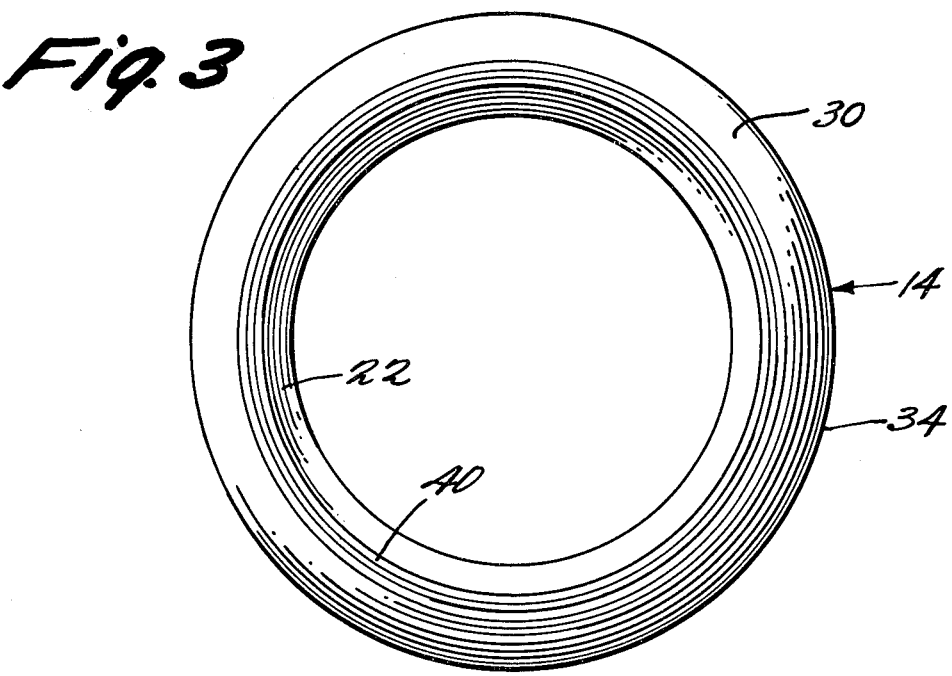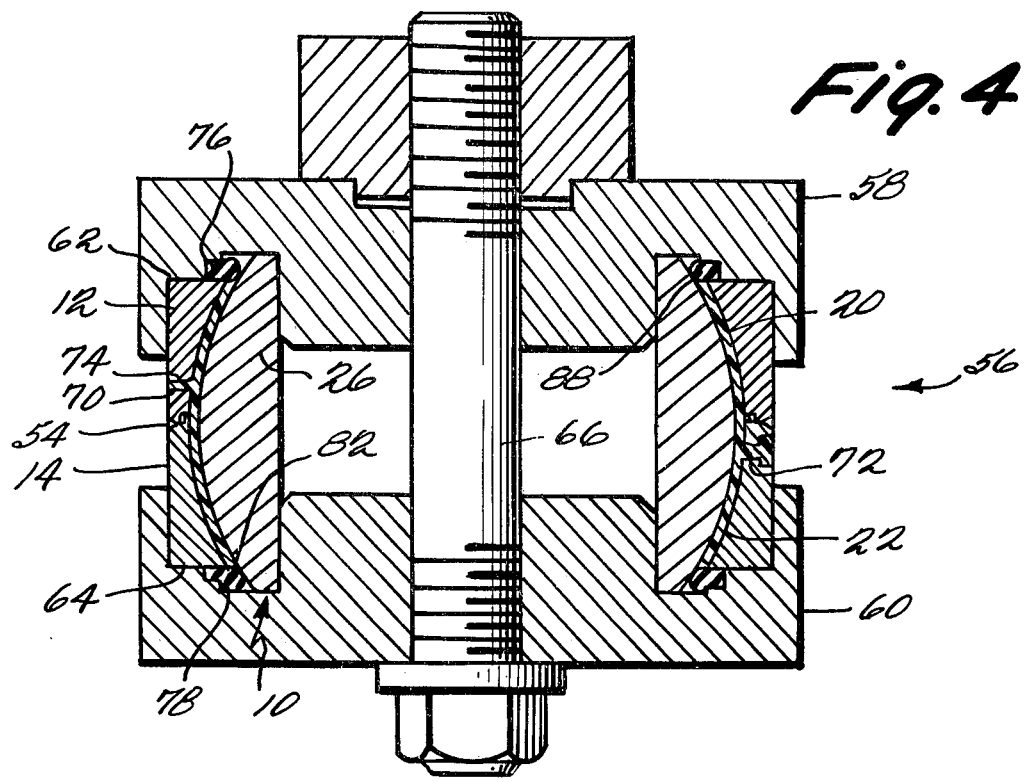

BEARING ASSEMBLY

This is a division, of application Ser. No. 597,632 filed July 21, 1975, now U.S. Pat. No. 4,033,019, issued July 5, 1977.

BACKGROUND AND SUMMARY OF THE INVENTION

The present invention relates to bearing assemblies of the self-aligning type and, more particularly, to a method of assembling bearings which include a bearing surface made of a curable mixture such as an acrylate composition and a particulate solid lubricant.

In the art of constructing self-aligning bearings, wherein a truncated ball member which has a hollow core is retained in an outer bearing race member, the problem of assembling the bearing with the outer race member encompassing the ball member without destroying the structural integrity of the resulting bearing assembly has long been known.

Previously, it has been the practice to employ mechanical force to swage the outer bearing member about the ball surface. However, it is readily apparent that the amount of deformation that results is unpredictable in many instances and will result in non-uniform bearing surfaces which contributes to localized deterioration of these surfaces and thus premature failure of the bearing assembly. Also, as is well known, in order to employ mechanical deformation, one of the bearing elements must be made from a material that is deformable while the other bearing element must be constructed from a substantially harder material. As a result, the wear characteristics and durability of the resulting bearing are limited by the lower tensile characteristics of the softer material. This latter disadvantage is overcome to a degree by the use of injected plastic bearing surfaces, however, the problem of assembling the outer bearing rings about the ball member is not significantly alleviated by resort to such procedures since the necessity of deforming the outer race member to retain the ball member is still present. Moreover, where such plastic bearing surfaces are first injected or disposed between the inner and outer bearing members prior to deformation of the outer bearing element, the necessary subsequent swagging or deformation step can often result in the same unpredictable localized surface irregularities as were present in the metal to metal bearing assemblies.

Ideally, it is desirable to employ substantially identically hardened inner and outer bearing elements to thus maximize the durability of the bearing assembly. As a consequence, it has been proposed to employ finely machined and completely hardened outer bearing elements which are mechanically maintained in an assembled condition.

Such arrangements, however, suffer from the disadvantage that where the bearing assembly is subjected to high frequency vibrations and/or a great range of environmental variations in terms of temperature or moisture such as are encountered in aircraft applications, non-uniformities or misalignment in the bearing surfaces will result and thus cause premature bearing failure.

Where one of the bearing surfaces consists of a molded composition or a spray deposited brittle material, such non-uniformities in the alignment of the bearing elements is particularly disadvantageous since the bearing composition will be subjected to localized stresses which will invariably damage the bearing composition.

In some arrangements, it has been proposed to secure the outer bearing members directly to a housing by fusion welding in an axial direction the outer surface of the bearing elements to a housing. It has been found to be impractical, however, for a manufacturer of bearing elements to employ fusion welding for every type of application of the bearing assembly. Additionally, particularly where a molded composition is employed as the bearing surface, the stress concentration and shrinkage which result from fusion welding can result in an unpredictable misalignment of the molded bearing surface with the inner ball member particularly where the outer welded member is being secured to an external housing.

The improvements of the present invention will provide useful solutions to a number of the foregoing problems recognized in the prior art as well as advantages which will enhance the production efficiency as well as extend the useful life of the resulting bearing assemblies.

According to the method of the present invention, in one embodiment, two ring members of substantially identical dimensions are provided with inner annular surfaces which, when the rings are joined together, form the outer bearing race surface which may be coated with a curable bearing surface composition. The ring members are provided with substantially planar mating surfaces, each of which is formed with an annular recess adjacent the inner edge of each ring. Thus, when the rings are placed in assembled condition, the recesses will define a circumferential cavity. With the ball member having been previously inserted in one of the ring members, the other ring member is placed in contact with the first ring member. The ring members are held together by a circumferential electron beam weld which is radially directed from the outer periphery of the ring members to the cavity defined by the abutting recesses in the mating surfaces. The provision of the cavity serves to define the limit of the depth of penetration of the electron beam weld and will control any splatter resulting from the heating of the metal. Also, provision of the circumferential cavity will reduce stress concentration by compensating for shrinkage in the assembled bearing elements. That is to say, the walls of the cavity will absorb any localized deformations resulting from the heat generated as a result of the fusion bonding so that stresses that would normally be set up in the elements will be absorbed by deformation of the cavity walls.

In another embodiment, one of the mating surfaces of the ring members is provided with an upstanding lip at its inner peripheral edge with the inner walls of the lip defining the inner wall of the recess and, in the assembled condition, the cavity. The mating surface of the other ring member is provided with a recess about its inner peripheral surface into which the upstanding lip of the other ring member will project to close the recess when the elements are assembled. The radial thickness of the lip is less than the radial width of the recess so that, in the assembled condition, an annular void will exist. Thus, not only is accurate alignment of the two ring members assured but also, a void is provided to absorb molten metal and prevent the molten metal from reaching the inner annular surfaces of the ring members during the welding operation so that the physical integrity of the inner annular surfaces will be preserved. This is particularly important where the inner annular surfaces are to be coated with a bearing composition which, preferably, consists of an acrylate composition mixed with a particulate solid lubricant such as polytetrafluoroethylene, silver powder, lead powder, molybdenum disulphide or fiberglass flock, as described in U.S. Pat. No. 3,806,216, of Apr. 23, 1974, which is assigned to the same assignee as the present invention. While other types of moldable bearing compositions may be employed, the types described in the aforementioned U.S. Patent are particularly useful with the method of the present invention since the welding operation of the present invention assures the obtaining of the uniform and aligned inner annular surface for receiving the polymeric composition whereby the possibility of localized non-uniformities in the bearing surface are substantially minimized, if not entirely eliminated.

The foregoing and other advantages will become apparent as consideration is given to the following detailed description and accompanying drawings, in which:

BRIEF DESCRIPTION OF THE DRAWINGS

FIG. 3 is a plan view of one of the ring members of FIG. 1 with the ball member and upper ring member removed; and, FIG. 4 is a sectional view illustrating the placement of the parts in a mold to produce the bearing assembly.

DETAILED DESCRIPTION OF THE INVENTION

Figure 1:
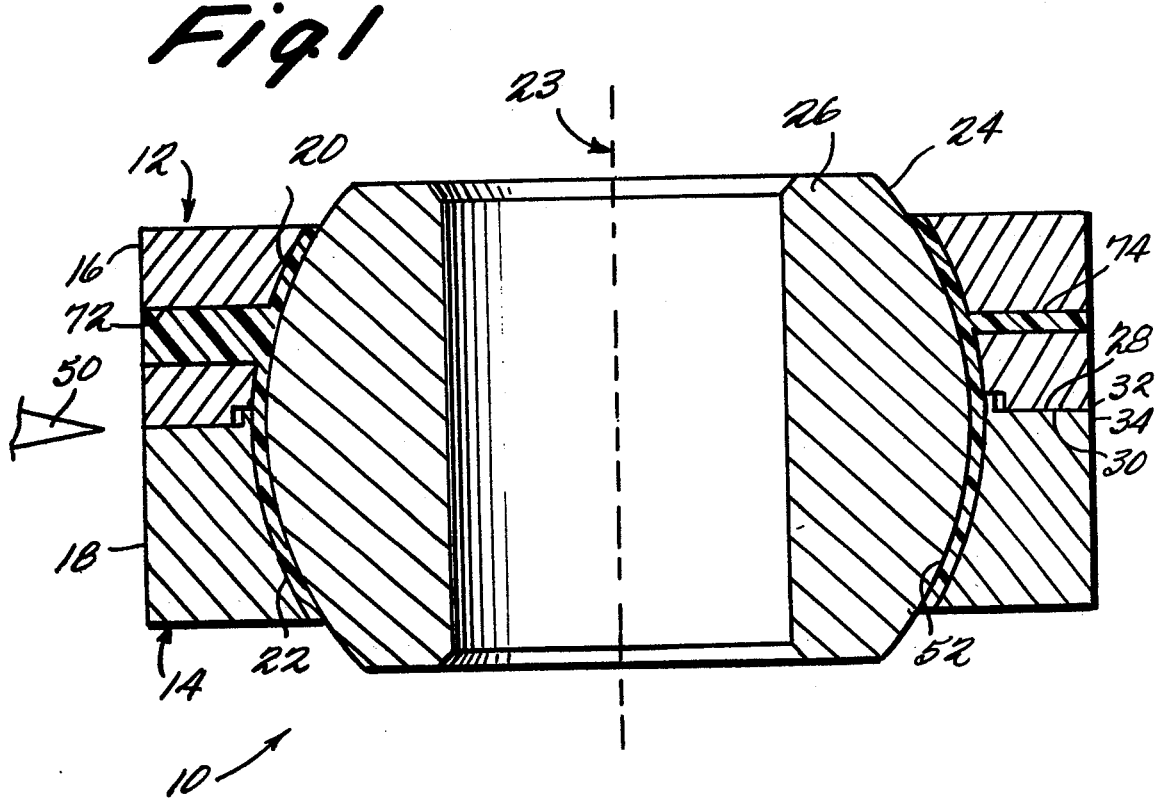
FIG. 1 is a sectional view taken along a diameter of the ball member and illustrating the orientation of the ball member relative to the ring members.

FIG. 1 shows a bearing assembly, generally designated at 10, which consists of a first ring member 12 and a second ring member 14. Preferably, the ring members should be made from fine grained stainless steel to provide the necessary high tensile strength. The ring members each have a circular outer peripheral surface 16 and 18, respectively, while the inner surfaces 20 and 22 are annularly shaped and are concave to conform to the spherical surface 24 of the ball member 26. As explained hereinafter, in the assembled condition the annular surfaces are symmetrical about a common central axis 23. Each ring member 12 and 14 is provided with a generally flat or planar mating surface 28 and 30, respectively. Each mating surface extends from the outer edges 32 and 34 respectively of each ring member to the respective inner edges of the inner annular surfaces 20 and 22.

Figure 2:
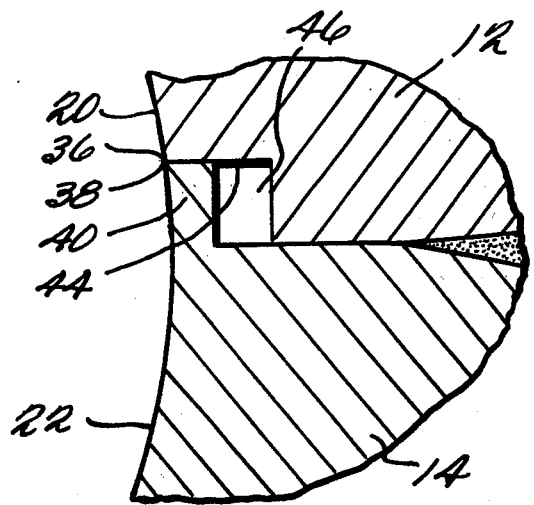
FIG. 2 is a greatly enlarged sectional view of the ring members of the present invention.

In FIG. 2, there is shown a greatly enlarged sectional view of the inner edges 36 and 38 of the mating surfaces of the ring members 12 and 14. As is shown in FIG. 3, ring member 14 is provided with a circumferential lip 40 about the opening bounded by the surface 22. A recess 44 is provided in mating surface 28 of the ring member 12. The lip 40 is located so as to interfit with the recess 44 provided in the mating surface 28 of ring member 12 and since the radial thickness of the lip 40 is less than the radial width of the recess 44, a peripheral space or void 46 is provided when the ring members 12 and 14 are assembled with their mating surfaces 28 and 30 in abutting relationship as illustrated in FIG. 1.

In carrying out the method of the present invention, the ball member 26 is first disposed in one of the ring members 12 or 14 and then the other ring member is placed in position with its mating surface abutting the mating surface of the other ring member whereby the ring members 12 and 14 encompass and retain the ball member 26. With the ring members held together by suitable mechanical clamps, an energized beam 50 of particles such as electrons is directed at the mating surfaces 28 and 30 in a radial direction relative to the orientation of the ring members to melt the mating surfaces and fuse them together. The fusion weld is effected circumferentially by either moving the electron beam source about the perimeter of a stationary bearing assembly 10 or by rotating the bearing assembly relative to the beam source. The depth of penetration of the weld is controlled by the dwell time of the beam source and its power amplitude.

According to the present invention, in a preferred embodiment, the fusing of the mating surfaces 28 and 30 should extend radially inwardly from the outer edges 32 and 34 to a depth of 60 to 97% measured radially of the interface defined by mating surfaces 28 and 30.

As is well known in the art of metallic welding, the metal when heated expands and sets up stress concentrations in the material. Since cooling of the fused area proceeds from the outermost regions exposed to the atmosphere to the more interiorly located regions, the relaxation of these stress concentrations is, in general, non-uniform and unpredictable. The provision of a circumferential cavity adjacent the inner annular surface of the ring members will substantially lessen the possibility of the transmission of stresses due to shrinkage to the inner annular surfaces of the bearing elements since the circumferential cavity 46 defined by the lip 40 and recess 44 can absorb any stresses by the deformation of the walls of the cavity itself. Additionally, in the circumstance where the depth of penetration of the electron beam is too great, the cavity will serve as a weld barrier by absorbing molten metal splatter that results from a heat of fusion thus preserving physical integrity of the inner annular surface of the bearing elements.

In a further embodiment, according to the method of the present invention, a bearing surface composition 52 is applied to the inner annular surfaces 20 and 22 of the assembled and bonded ring members 12 and 14. Preferably, the composition 52 and the method of applying it are as disclosed in U.S. Pat. No. 3,806,216 the disclosure of which is incorporated herein by reference.

In FIG. 4, one method of applying the bearing surface 52 is illustrated. The bearing assembly 10, with the ring members 12 and 14 now fusion bonded together as at 54 to permanently encompass the ball 26, is disposed in a mold generally designated at 56 and which has an upper section 58 and a lower section 60. The ring members 12 and 14 are held in place by inner annular shoulders 62 and 64 and the upper section 58 of the mold 56 is held in place by a threaded bolt 66 as illustrated.

The surface of the ball member 26 is coated with a thin layer of a parting agent as previously described.

The passages 72 and 74 communicate with the inner annular surface 20 of the ring member 12.

Where a bearing surface is to be applied to the inner annular surfaces of the ring members, the ball member must be accurately located in the mold 56 to provide a uniform clearance between the surface of the ball member 26 and the inner annular surface 20 and 22. To this end, O-rings 76 and 78 are provided about the end faces of the ring members 12 and 14 to both retain the ball member in its proper orientation and also to seal the space as at 80 and 82 between the surface of the ball member 26 and the outer edge of the ring members.

With the elements disposed as illustrated in FIG. 4, a curable bearing surface compound mixture such as is disclosed in U.S. Pat. No. 3,806,216, is injected under low pressure, and at room or ambient temperature to completely fill passage 72 and the void between the inner annular surfaces 20 and 22 and the surface of the ball member 26 as well as passage 74. Injection is continued until the molding composition begins to flow out of vent orifice 70 at which time injection is stopped.

Curing of the composition is then effected in the manner described in the aforementioned U.S. Patent. Use of the parting agent as previously described will facilitate the freeing-up of the ball member after curing.

The use of polymeric bearing surface compositions as well as other bearing surface compositions such as polytetrafluoroethylene which may be in fabric form or nylon are particularly useful with the method of the present invention since the method of assembly of the two ring members assures a smoothly uniform inner annular surface for receiving the bearing surface compositions. It should be understood, however, that for a number of bearing applications, the present invention is broadly useful with metal to metal contact as well as ceramic surfaces of the like.

It should be understood that the foregoing preferred embodiments are illustrative only and that the present invention is capable of many variations as are encompassed within the spirit and scope of the appended claims.

What is claimed is:

1. An outer bearing element for a self-aligning bearing of the type having a truncated ball as the inner bearing element, said outer bearing element comprising first and second hemispherical ring members, said ring members each having a generally planar mating surface and inner annular surfaces that are symmetrical about a common central axis, said mating surfaces of said ring members being placed in abutting relationship, each of said mating surfaces having inner and outer circumferential edges between which a said mating surface extends, one of said ring members having an annular lip adjacent said respective inner circumferential edge, said other of said ring members having an annular recess adjacent said respective inner circumferential edge, with said lip extending into said recess to define a closed, circumferential cavity about said common central axis, said mating surfaces of said ring members being fusion-bonded together between said outer circumferential edges and said cavity.

* * * * *